(12) United States Patent
Urban et al.

(10) Patent No.: US 10,279,545 B2
(45) Date of Patent: May 7, 2019

(54) METHOD FOR THREE-DIMENSIONAL COLOR PRINTING AND A THREE-DIMENSIONAL COLOR PRINTING DEVICE

(71) Applicant: Fraunhofer-Gesellschaft zur Förderung der angewandten Forschung e.V., München (DE)

(72) Inventors: Philipp Urban, Seeheim (DE); Alan Brunton, Grenoble (FR); Can Ates Arikan, Darmstadt (DE)

(73) Assignee: Franuhofer-Gesellschaft zur Förderung der angewandten Forschung e.V., München (DE)

( * ) Notice: Subject to any disclaimer, the term of this patent is extended or adjusted under 35 U.S.C. 154(b) by 554 days.

(21) Appl. No.: 14/945,993

(22) Filed: Nov. 19, 2015

(65) Prior Publication Data
US 2016/0151979 A1 Jun. 2, 2016

(30) Foreign Application Priority Data
Nov. 24, 2014 (EP) .................................... 14194608

(51) Int. Cl.
| | |
|---|---|
| *B29C 64/386* | (2017.01) |
| *B29C 67/00* | (2017.01) |
| *G06T 19/20* | (2011.01) |
| *B33Y 50/00* | (2015.01) |
| *B29C 64/106* | (2017.01) |
| *B29C 64/112* | (2017.01) |

(Continued)

(52) U.S. Cl.
CPC ........ *B29C 67/0088* (2013.01); *B29C 64/106* (2017.08); *B29C 64/112* (2017.08); *B29C 64/386* (2017.08); *B29C 64/40* (2017.08); *B33Y 50/00* (2014.12); *G06T 19/20* (2013.01); *B29K 2995/0021* (2013.01); *B29K 2995/0029* (2013.01); *B33Y 10/00* (2014.12); *B33Y 30/00* (2014.12); *B33Y 50/02* (2014.12); *G06T 2219/2012* (2013.01)

(58) Field of Classification Search
CPC ....... G06T 19/20; B29C 64/10; B29C 64/112; B29C 64/386; B29C 64/393
See application file for complete search history.

(56) References Cited

U.S. PATENT DOCUMENTS

| | | |
|---|---|---|
| 2013/0196060 A1 | 8/2013 | Pla et al. |
| 2014/0257549 A1 | 9/2014 | Swartz et al. |

(Continued)

OTHER PUBLICATIONS

J. Morovic et al. "HANS A new color separation and half-toning paradigm".

(Continued)

*Primary Examiner* — Peter L Vajda
(74) *Attorney, Agent, or Firm* — Frank J. Bonini, Jr.; Bonini IP Law, LLC

(57) ABSTRACT

The invention relates to a method and a device for three-dimensional color printing, wherein at least a first printing material with a first printing material color and at least another printing material with another printing material color is used to construct a printing object (7), wherein an arrangement of the printing materials in a surface region and a near surface interior region of the printing object (7) is determined based on a desired color reproduction of the printing object.

18 Claims, 3 Drawing Sheets

(51) Int. Cl.
*B29C 64/40* (2017.01)
*B33Y 10/00* (2015.01)
*B33Y 30/00* (2015.01)
*B33Y 50/02* (2015.01)

(56) References Cited

U.S. PATENT DOCUMENTS

2014/0277661 A1  9/2014  Amadio et al.
2014/0312535 A1  10/2014 Dikovsky et al.
2015/0258770 A1* 9/2015  Chan .................... B33Y 50/02
                                          700/98

OTHER PUBLICATIONS

S. Mourad et al. "Doubling the color gamut volume of ink-jet prints using simple-post processing", Conference on Color and Graphics, Imaging, and Vision, vol. 2006, No. 1, Soc.
M. Stanic et al. "Color measurements of 3 dimensional ink-jet prints, NIP and digital fabrication conference", vol. 2008, No. 2, Society for Imaging science and Technology 200.

* cited by examiner

METHOD FOR THREE-DIMENSIONAL COLOR PRINTING AND A THREE-DIMENSIONAL COLOR PRINTING DEVICE

BACKGROUND OF THE INVENTION

1. Field of the Invention

The invention relates to a method for three-dimensional color printing and a three-dimensional color printing device.

2. Brief Description of the Related Art

Three-dimensional printing or 3D printing refers to processes for printing a 3D object which can be also refer to as printing object. Existing 3D printers can use a variety of printing materials, wherein only few materials can be combined simultaneously for printing a printing object. As a result, the color gamut of the said 3D printing device is restricted and corresponds to only a fraction of the color space as only a limited number of colors can be generated, in particular via subtractive or autotypical mixture.

Therefore, printing objects or parts thereof which have a color outside the color gamut of the 3D printing device result in a false color reproduction.

It is known to provide an arrangement of printing materials by using half-toning algorithms. The document "J. Morovic et al. "HANS A new color separation and half toning paradigm", Color and Imaging conference, vol. 2010, no. 1, Society for Imaging Science and Technology, 2010 demonstrates that the color gamut volume depends on the half-toning algorithm.

Also known is to apply a chemical layer after printing is finished to enlarge a color gamut (see e.g. the document "S. Mourad et. al., "Doubling the color gamut volume of inkjet prints using simple-post processing", Conference on Color and Graphics, Imaging, and Vision, vol. 2006, no. 1, Society for Imaging science and Technology, 2006").

In so called powder-binder jetting systems, full-color objects can be printed. Corresponding 3D printers use an inkjet-based technology for coloring a base material (powder). Via a post-processing, e.g. an infiltration of epoxy or cyanoacrylate-based particles, the color space can be enlarged (see e.g. the document "M. Stanic et. al., "Color measurements of 3-dimensional ink-jet prints", NIP and digital fabrication conference, vol. 2008, no. 2, Society for Imaging science and Technology, 2008").

Further known is 3D printing by a method referred to as polyjetting or multi-jet modeling. Herein, multiple printing materials are combined. UV-hardening printing inks are deposited and hardened slice by slice. Actual 3D printers, however, can combine only a limited numbers of printing materials, e.g. only up to three printing materials.

It is further known to use support material within the 3D printing process. The support material is a material which is regularly used in the printing process temporarily, in particular to physically support overhanging parts or portions of the printing object. After the 3D printing process is finished, the support material is removed, e.g. in a removal step.

Accurate color reproduction is important in many applications of 3D printing, especially for design-prototypes or 3D copies, where a texture-mapped 3D scan of an object is to be reproduced in a color-consistent way. However, existing 3D printers, in particular the aforementioned polyjet printers, use colored printing materials which are highly translucent. Such materials have high transmission and scattering properties, which effectively result either in blurring of color edges, or severe dot-gain if care is not taken to account for these properties. Thus, the organization of the printing materials within significant distance to the surface of the printing object, e.g. as much as a half a centimeter, can greatly affect the perceived color. It is therefore highly important to control material placement several layers of voxels beneath the surface, taking into account the transmission and scattering properties of the materials, greatly complicating the computational aspects of half-toning algorithms.

There is the technical problem of providing a method for 3D color printing and a 3D color printing device by which a quality of the printing object, especially the quality of a color reproduction, is improved, in particular (but not exclusively) if translucent printing materials are used. Further aspects are to provide a method for 3D color printing and a 3D color printing device which enlarge a color gamut of a 3D color printing device and/or which allow a fast computational and efficient processing of desired printing data, in particular a generation of control data for printing.

SUMMARY OF THE INVENTION

A method for three-dimensional color printing (3D printing) is proposed. At least a first printing material with a first printing material color is used to construct a printing object. In other words, the at least first printing material is used to generate or build the printing object or a part thereof. The printing object can denote the object which is to be printed, i.e. constructed by the proposed method. The 3D printing process used to construct the printing object is known to the skilled person.

In particular, the printing process can comprise the generation of successive slices in a vertical direction (Z-direction), wherein the slices can be oriented parallel to a plane spanned by a longitudinal direction (X-direction) and a lateral direction (Y-direction). The mentioned directions can provide directions of a reference coordinate system. A slice denotes a two-dimensional cross section through the printing object, e.g. with a predetermined thickness, wherein the section plane is perpendicular to the aforementioned vertical direction.

Before printing, e.g. in a modelling step, a model of the 3D printing object can be created, e.g. by computer aided design (CAD). A model can also be generated by 3D-scanning with captured color texture data.

Based on the model of the 3D printing object, control data for a 3D printing device can be generated wherein the control data is used to control the printing process. Within the modelling step, a desired color can be assigned to the printing object or parts thereof. As a result, the control data can encode color information of the printing object, e.g. in form of a color vector, wherein entries of said color vector correspond to intensities of a desired color. The desired color does not necessarily need to correspond to a printing material color.

The 3D color printing process can e.g. be an extrusion-based process, a wire-based process, a granular-based process, a powder-bed process or a lamination-based process.

Preferably, the 3D color printing process is a polymerization-based process. In polymerization-based printing processes, liquid printing materials with predetermined printing material colors, e.g. liquid photopolymers, are applied into or onto a layer and exposed to radiation, e.g. to a laser beam, in order to harden the exposed printing material. Printing materials can e.g. be translucent printing materials. For example, printing materials can be provided by printing inks wherein the printing inks can be hardened after their application onto or into a layer, e.g. by exposure to light, in particular to UV radiation. The printing inks can have different colors. This process can also be referred to as polyjetting which is also known as multi-jet processing.

It is further possible to use least one support material with a first support material color to support the construction of the printing object. The support material can e.g. be used to physically support overhanging parts or portions of the printing object. The support material is defined as described previously. The support material can also be a translucent material.

In particular, the support material denotes a material which can be removed from the printing object in a non-destructive way, e.g. in a removal step subsequent to the printing process. In particular, the support material can denote a material which can be removed mechanically, e.g. by a water jet, or chemically, e.g. by resolving the support material in a chemical bath. The support material can e.g. be solvable by a resolvant, wherein the printing material is not solvable by said resolvant. The resolvant can e.g. be water. Alternatively or in addition, a robustness or strength, in particular a compressive strength and/or an ultimate tensile strength and/or a bending strength and/or a torsional strength and/or a shear strength, of the support material can be smaller than the strength of the printing material(s). In particular, the maximal strength of the support material can be smaller than a predetermined percentage of the minimal strength of the printing material with the minimum strength, e.g. smaller than 0.9, smaller than 0.75, smaller than 0.5 or smaller than 0.3 of the minimal strength.

Further, at least another printing material with another printing material color is used to construct a printing object. Preferably more than two, e.g. three, printing materials are used to construct the printing object, wherein all printing materials have different printing material colors. The colors of the printing materials can define corners of the color gamut. The color gamut is defined by mixing the printing materials.

Further, an arrangement of the printing materials in a surface region and a near-surface interior region of the printing object is determined based on a desired color reproduction of the printing object. In other words, the arrangement of printing materials during printing of the printing object is chosen such that the printing object or volume fractions thereof reproduce the desired color or such that a coloring defect which denotes a deviation between a desired color reproduction and the provided color reproduction, is reduced or minimized. The arrangement of printing materials can be determined based on optical characteristics of the printing materials, e.g. based on scattering and/or translucence characteristics, in particular such that the printing object or volume fractions thereof reproduce the desired color or such that a coloring defect which denotes a deviation between a desired color reproduction and the provided color reproduction, is reduced or minimized.

Further, the printing materials can be arranged within the surface region and within the near-surface region according to the determined arrangement in a printing step. Within the printing step, a printing device can be controlled such that the printing materials are arranged accordingly. A reproduction of colors or color tones can be generated by an adequate spatial arrangement of unit volumes (defined by the printer resolution), referred to as voxels, filled by printing materials with different printing material colors. A remaining region of the printing object can be provided by a reference printing material which will be explained later.

This means that not only the arrangement of materials in the surface region but also in interior regions is taken into account for providing a desired colorization of the printing object.

This advantageously improves the color reproduction of the resulting printing object, e.g. as it increases the color gamut if translucent printing materials are used.

In another embodiment, a voxel-based representation of the printing object is determined, wherein a surface layer voxel set and a near-surface interior voxel set are determined. The surface layer voxel set comprises all voxels intersected by the surface of the printing object. The set of near-surface interior voxels preferably comprises only a subset of all interior voxels. The process of decomposing the printing object into voxels can also be referred to as voxelization. Such a process is known to the skilled person.

It is, for instance, possible to assign desired color values, e.g. a sRGB color value, to a surface of the printing object, e.g. in the modelling step. As such a desired color value is not necessarily equal to a printing material color, the desired color value can be converted into a printing material color vector, wherein the printing material color vector comprises one entry per printing material and the value of an entry corresponds to a portion of the respective printing material color to reproduce the desired color. For example, a sRGB color can be mapped to a printing material color vector of (c, m, y) where c is the tonal value for cyan, m is the tonal value for magenta and y is the tonal value for yellow. Entries of the printing material color vector can also be referred to as tonal value, wherein a tonal value defines the local percentage of the printing material. Thus, the printing material color vector can also be referred to as tonal value vector. The printing material color vector represents the amount or intensity of each printing material required to reproduce the desired color.

It is possible that a reference printing material color exists, wherein the printing material color vector does not comprise an entry (tonal value) related to the reference printing material color. The reference printing material color can be the color of one of the used printing materials. The reference printing material color can e.g. be a white color.

The color-related entry can be a numerical value encoding a desired intensity of said printing material color, in particular in a volume fraction of the printing object. The numerical values can e.g. be chosen from a printing material color value interval, e.g. an interval from 0 (inclusive) to 1 (inclusive) or an interval from 0 (inclusive) to 255 (inclusive).

Moreover, it is possible to discretize the printing object into a set of object voxels. Surface voxels can be voxels of a boundary layer of the printing object, wherein the boundary layer is the barrier layer or the transition layer between the printing object and the exterior. Thus, surface voxels can comprise the voxels of the printing object that separate interior from external voxels or voxels which are intersected by a printing object surface. Interior voxels can denote the remaining voxels of the printing object. In particular, an interior voxel can denote an object voxel which is fully enclosed by surface voxels.

It is further possible that a desired color value is assigned to each voxel, in particular to each surface voxel, wherein this desired color value is subsequently converted into the printing material color vector. Then, the printing material color vector is assigned to the voxel. Alternatively, the desired color value can be first converted and subsequently assigned to a voxel, in particular a surface voxel.

Further, one of the printing materials is assigned to each surface voxel. Moreover, one of the printing materials is assigned to each near-surface interior voxel. The assignment of a printing material to a voxel is based on the desired color reproduction of the printing object. A reference printing material which will be explained later can be assigned to the remaining interior voxels.

It is, for instance, possible to assign one of the printing material colors to a voxel. Then, the corresponding printing material is assigned to said voxel.

The assignment of one of the printing materials or one of the printing materials colors to a voxel can e.g. be provided by a half-toning algorithm. Half-toning algorithms are known to the skilled person. Advantageous half-toning processing methods will be described in the following.

It is possible to perform a half-toning algorithm to assign a printing material only to voxels of the surface layer voxel set. An assignment of a printing material to voxels of the near-surface interior voxel set can subsequently by determined based on the printing material assignment to the voxels of the surface layer voxel set. Thus, the assignment of a printing material to a voxel of the near-surface interior voxel set is performed independent of a half-toning algorithm, in particular not using a half-toning algorithm. Alternatively, it is possible to perform a half-toning algorithm to assign a printing material to voxels of the surface layer voxel set and a half-toning algorithm to assign a printing material to voxels of the near-surface interior voxel set.

Within the assignment, e.g. within a half-toning algorithm, a printing material color quantization can be performed for each voxel. As a result, a quantized printing material color vector can be assigned to a voxel. This will be explained later. An error due to the printing material color quantization can be distributed to neighboring voxels, e.g. using an error diffusion mask or error diffusion filter. Thus, the half-toning algorithm can comprise an error diffusion step. The assignment of a printing material to a voxel can then be based on the printing material color vector or the quantized printing material color vector which is assigned to the respective voxel.

It is, for instance, possible that a printing device is controlled such that the volume fraction of the printing object which corresponds to a voxel is provided or constructed by the printing material assigned to the voxel. That a printing material is used to construct the printing object means that at least one object voxel is filled by the printing material or that an object voxel is provided by the printing material. A size of the voxel can depend on a resolution of the printing process. The resolution of the printing process can e.g. be 300 dpi in a plane spanned by the X-direction and the Y-direction and 600 dpi in the Z-direction, wherein the directions X, Y, Z, provide a Cartesian coordinate system. In the printing step, the voxels can thus be provided by the material assigned to the respective voxel, e.g. by a printing device.

The proposed embodiment advantageously allows an effective handling of the printing process in terms of speed and required computing capacity.

In another embodiment, a printing material color quantization is performed for each voxel of at least the surface layer voxel set. This means that the quantization can be performed for each surface voxel of the surface layer voxel set. Quantization can e.g. be performed by traversing the set of voxels to be quantized, wherein the currently selected voxel is quantized. Voxels for which the quantization has been performed can also be referred to as quantized voxels, wherein voxels for which the quantization has not been performed can be referred to as non-quantized voxels.

It is, of course, possible to perform quantization also for each voxel of the near-surface interior voxel set or, as will be explained later, for each interior voxel of an interior layer voxel set.

Within the quantization, for each printing material color, a minimal or maximal color value of the printing material color can be assigned to the respective layer voxel. In other words, for each entry of the aforementioned printing material color vector, a quantized color value can be determined. Thus, a quantized printing material color vector can be obtained by either assigning a minimal or a maximal color value of the respective material color to the respective entry. The maximal color value can e.g. correspond to 1, wherein the minimal color value can correspond to 0. In this case, an un-quantized color value of the printing material color can be between 0 and 1. In this case, it is possible that quantized voxel denote voxel for which the quantized printing material color vector has been determined, wherein a non-quantized voxel can denote a voxel for which the quantized printing material vector has not been determined.

The quantized printing material color vector can represent that a printing material color is assigned to a voxel or not. A printing material can e.g. be assigned to the voxel if the maximal color value is assigned to the corresponding entry, wherein the printing material is not assigned to the voxel if the minimal color value is assigned to the entry.

The quantization can e.g. be a threshold-based quantization. A maximal printing material color value can e.g. be assigned if the un-quantized printing material color value is higher than a predetermined threshold value, e.g. 0.5. The minimal printing material color value can e.g. be assigned if the printing material color value is smaller than or equal to the predetermined threshold value. However, other quantization strategies are known to the skilled person.

The quantization can introduce a color error on the voxel (selected voxel) which has been quantized.

This color error value is distributed among voxels within a predetermined neighborhood of the respective layer voxel. This can also be referred to as error diffusion. The color error value can denote the difference between the quantized printing material color value and the un-quantized printing material color value.

The neighborhood can contain a selected number of voxels in the vicinity of the selected voxel, wherein a weight can be assigned to each neighboring voxel from the selected number. The color error value or the product of the weight and the color error value can e.g. be added to or subtracted from the un-quantized printing color value of the neighboring voxel.

The voxels of the neighborhood can e.g. be provided by a neighboring or adjacent voxel located above the selected voxel and/or neighboring or adjacent voxel ahead of the selected voxel and/or a neighboring or adjacent voxel above and behind the selected voxel with reference to a local coordinate system. The local coordinate system can have an x-axis (longitudinal axis) which is oriented parallel to the traversal direction and a z-axis (vertical axis) which is oriented parallel to the aforementioned vertical axis of the reference coordinate system. The origin of the local coordinate system can be located at the currently selected voxel. The terms ahead and behind can relate to the traversal direction (longitudinal direction of the local coordinate system), wherein the traversal direction can e.g. be defined by the vector pointing from a preceding selected voxel to the currently selected voxel during traversal. The term above can relate to the vertical axis of the local coordinate system. It is thus possible to shift the color error value or a portion thereof to a neighboring voxel in another slice, in particular in the next slice along the vertical direction of the reference coordinate system.

It is, for instance, possible to apply an error diffusion filter which distributes the color error value to selected neighboring voxels. Numerous error diffusion filters can be used for this purpose, e.g. a fixed filter as described in the document "Floyd and Steinberg, An adaptive algorithm for the spatial grey scale, Proceedings of the Society of Information Display, 17, 1976" or alternatively, a filter with entries that vary depending on the input tonal value of the selected voxel as e.g. described in the document "Ostromoukhov, A simple and efficient error-diffusion algorithm, Proc. SIGGRAPH, 2001. Further, the quantization threshold can be modulated in conjunction with the filter values as e.g. described in the document "Zhou and Fang, Improving mid-tone quality of variable-coefficient error diffusion using threshold modulation, Proc. SIGGRAPH 2003". The proposed method can use, but is not limited to, all of these techniques.

The assignment of a printing material to the respective voxel can be based on the set of quantized printing material colors. The quantized printing material colors can be represented as a vector which can be referred to as quantized printing material color vector. If only one entry of the quantized set is assigned to a maximal value, the printing material which corresponds to said entry can be assigned to the voxel. If more than one entry of the quantized set is assigned to a maximal value, the printing material which corresponds to said entry with the lowest color error value can be assigned to the voxel. Alternatively, a random entry of the entries with the maximal value can be chosen and the corresponding printing material can be assigned to the voxel. Alternatively, a tie-breaking algorithm can be applied to select one of the possible printing materials. If no entry of the quantized printing material color vector is assigned to a maximal value, the printing material with the aforementioned reference color, in particular a white color, can be assigned to the voxel.

In other words, zero, one or more than one printing material colors can be quantized to the maximal value by the aforementioned quantization at the selected voxel, In the case where more than one printing material colors are quantized to the maximal value, a method for determining, which printing material to assign to the selected voxel can be applied.

Within an exemplary tie-breaking algorithm, a priority measure, e.g. a numerical value, for each printing material can be maintained, wherein the priority measure can represent the current priority of assigning said printing material color. When two or more printing material colors are quantized to the maximal value, the printing material corresponding to the printing material color with the highest priority measure can be assigned to the selected voxel, and the priority measure of the corresponding printing material color can be reset to the lowest priority measure, e.g. to zero. The priority measures of the remaining printing material colors, which have been quantized to the maximal value, can be increased by a certain amount. The amount can e.g. depend on the printing material assigned and on the printing material color for which the priority measure is to be increased. Alternatively, the priority measure of a not assigned printing material color can be increased by a constant amount. The priority measure of each printing material color can be initialized to zero and can be left unchanged when the printing material color is quantized to the minimal value.

In another embodiment, at least one interior layer voxel set of the printing object is determined, wherein the distances of all voxels of the interior layer voxel set to the respective closest surface voxel are within a predetermined distance interval of none-zero distances, wherein a printing material color vector of the closest surface voxel is assigned to each voxel of the interior layer voxel set. This means that to each voxel, the printing material color vector of the surface voxel which is the closest surface voxel to the respective voxel, is assigned. A size of the distance interval can be chosen printing object dependent. Also, the size of the distance interval can correspond to the voxel size along the dimension with the minimal resolution.

The distance can denote a minimal distance from the respective voxel of the interior layer voxel set to a surface voxel, i.e. the distance to the nearest surface voxel. The distance can be measured within the aforementioned three-dimensional reference coordinate system.

An assignment of one of the printing materials to each voxel of the surface layer voxel set can be performed independently of an assignment of one of the printing materials to each voxel of the at least one interior layer voxel set. In particular, the assignment of one of the printing materials to each voxel of the surface layer voxel set can be provided by performing a half-toning algorithm depending only on voxels of the surface layer voxel set, wherein the assignment of one of the printing materials to each voxel of any one of the at least one interior layer voxel set can be provided by performing a half-toning algorithm depending only on voxels of the same interior layer set. This can also be referred to as layered half-toning.

This advantageously allows a performance-effective processing of interior voxels, i.e. a subsequent effective assignment of a printing material to an interior voxel.

Also described is an embodiment wherein multiple interior layer voxel sets of the printing object are determined. The distances of all voxels of one interior layer voxel set to a respective closest surface voxel are within a layer-dependent predetermined distance interval, wherein a printing material color vector of the closest surface voxel is assigned to each voxel of the interior layer voxel set. Of course, the layer-dependent distance intervals are different from one another. Distance intervals, however, can be chosen adjacent to one another. As an example, one, two, three, four or five interior layer voxel sets can be determined.

The distance interval can comprise values between $(k-1) \times$ Is (inclusive) and $k \times Is$, wherein $k=2 \ldots k_{max}$. In this formulation, $k_{max}$ denotes the number of interior layer voxel sets and Is denotes the size of the respective distance intervals. In this case, the distance interval for $k=1$ represents the surface layer voxel set. By increasing $k_{max}$, the color gamut can be increased.

The assignment of one of the printing materials to each voxel of a layer voxel set can be performed independent from the assignment of one of the printing materials to each voxel of any one of the remaining layer voxel sets.

The distance interval(s) of the at least one interior layer voxel set can be chosen such that all voxels of the near-surface interior voxel set are assigned to one of the interior layer voxel sets.

To improve computational efficiency, an interior layer voxel set can be provided by a minimally thick subset of the set of interior voxels which have distances to the nearest surface voxel within the predetermined distance interval for said layer. The thickness of said layer which can correspond to the range of the distance interval can e.g. correspond to the minimal resolution or the resolution in at least one axis.

Further, the interior layer voxel set can be provided by voxels which are adjacent to at least one interior voxel with a distance to the nearest surface voxel that is less than the lower bound of the predetermined distance interval. Such a minimally thick subset can maintain the same connectivity as the complete set of interior voxels within the predetermined distance interval.

In such a case, there can exist interior voxels that have not been assigned a printing material following the traversal and half-toning algorithm which will be explained later. The printing material which is assigned to each of these remaining interior voxels can be equal to the printing material of the nearest voxel, which has already been assigned a printing material, respectively. Such an embodiment is advantageous when the resolution of the 3D printing device varies significantly for the different print axes, e.g. when the slice thickness is less than half the dot size in either X or Y directions.

In an alternative embodiment, a set of non-quantized neighboring interior voxels is determined for each surface voxel of the surface layer voxel set. The set of non-quantized neighboring interior voxels can be provided by all interior voxels with a distance to the selected surface which is smaller than or equal to a predetermined maximal distance. Said set can comprise a large number of voxels, e.g. up to 5000 or more voxels.

The set of non-quantized neighboring interior voxels can be sorted according to a distance-based criterion, e.g. into a distance-sorted list in which the first entry has the smallest distance. In this case, the distance denotes the distance to the selected surface voxel. The distance can be determined in the aforementioned reference coordinate system.

A subset with a limited number of closest non-quantized neighboring interior voxels is selected, e.g. with 3, 5 or 10 closest non-quantized neighboring interior voxels. The closest non-quantized neighboring interior voxels can denote the interior voxels from the set of neighboring voxels with the smallest distance(s) from the selected surface voxel. The limited number can be smaller than the total number of determined neighboring voxels.

A single color value, in particular a single maximum color value or maximum entry, of the set of quantized printing material colors, e.g. of the aforementioned quantized printing material color vector, of the surface voxel is assigned to each non-quantized neighboring interior voxel of the subset in an alternating way. This can also be referred to as nibbling halftoning.

If, for instance, the quantized printing material color vector has three entries, wherein the first entry and the third entry has a maximal color value and the limited number is selected to be 3, the maximal color value of the first entry will be assigned to the first and the third closest non-quantized neighboring interior voxel, i.e. to the corresponding entry of its printing material color vector which is thus quantized. The maximal color value of the third entry will be assigned to the second closest non-quantized neighboring interior voxel, i.e. to the corresponding entry of the printing material color vector.

If all entries of the quantized printing material color vector of the surface voxel have a minimal color value, the aforementioned reference color, e.g. white, can be assigned to each non-quantized neighboring interior voxel of the limited number.

Thus, a quantization of interior voxels can be performed. A printing material can now be assigned to the quantized interior voxels, in particular the material corresponding to single entry of the quantized printing material color vector to which a maximal value is assigned.

This can be repeated until printing materials are assigned to all non-quantized neighboring interior voxels or for a predetermined number of times. If non-quantized interior voxels remain, the reference printing material color, e.g. a white color, can be assigned to the remaining voxels.

In this case, the assignment of one of the printing materials to an interior voxel depends on the assignment of one of the printing materials to a surface voxel.

Further described is an embodiment wherein for each surface voxel, a surface normal is determined. The surface normal is oriented into a direction which is oriented perpendicular to the surface at the respective surface voxel and points away from the printing object. The distance between the surface voxel and a neighboring interior voxel is determined depending on the distance along the surface normal. In particular, the distance or a component of the distance (normal component) can be equal to the distance along a direction opposite to the surface normal. Additionally, the distance can also dependent on a distance component oriented perpendicular to the surface normal (perpendicular component). If the distance is determined depending on a normal component and a perpendicular component, e.g. as a sum or the L1-norm of these components, the normal component can be weighted, e.g. with a weighting factor larger than zero and smaller than or equal to one. The smaller the weight, the smaller the weighted normal distance portion. This advantageously allows to select interior voxels concentrated in a direction opposite to the surface normal.

To improve computational performance, indexes of the sorted non-quantized neighboring interior voxels can be stored. If printing material is assigned to voxels, e.g. if the voxels have been quantized, corresponding indexes can be removed from consideration. Thus, in a following quantization step, the nearest non-quantized neighboring interior voxel can be easily determined as the voxel corresponding to the first entry of the set of considered indexes.

In another embodiment the voxels of at least the surface layer voxel set are traversed in at least one run, wherein the next voxel in the traversal is determined depending on the value of a distance-to-empty function of the next voxel, in particular depending on the value of a distance-to-empty function within the current slice.

The distance-to-empty function represents the distance of the selected voxel to the closest exterior voxel, in particular within the current slice. In particular, the distance-to-empty function has a monotonically increasing value for an increasing distance of the selected voxel to the closest exterior voxel. The distance can e.g. be determined using a L1-norm. It is, however, possible to use any other function for determining a distance. The value of the distance-to-empty function can e.g. be assigned to each voxel of the layer voxel set. A gradient or gradient vector of the distance-to-empty-function will be always oriented inwards relative to the connected component to which the selected voxel belongs. The determination of the distance-to-empty function and its gradient can be done in a preprocessing step. Thus, the next voxel can be determined depending on a value of the distance-to-empty function of said next voxel. Optionally, the value of the distance-to-empty function can also be determined for the selected (current) voxel. This allows determining the gradient information during traversal.

It is further possible to determine a set of candidate voxels. The candidate voxels can e.g. be determined as all untraversed voxels of the layer voxel set, wherein a distance of each the untraversed voxels to the selected voxel is smaller than or equal to a predetermined distance threshold value, e.g. a distance corresponding to the maximal size of one voxel. Alternatively, the candidate voxels can e.g. be determined as voxels of the layer voxel set with voxel coordinates which do not differ from the voxel coordinates of the current voxel by more than a predetermined number in at least one coordinate direction. In other words, the candidate voxels can e.g. be determined as voxels of the layer voxel set which are located within a distance range from the selected voxel, wherein the maximal distance is given by a the voxel size in the respective coordinate direction or a multiple of the voxel size in the respective coordinate direction. In other words, candidate voxels can be determined by their adjacency to the selected voxel with respect to the voxel grid. If a slice-dependent subset of the layer voxel set is considered, which will be explained later in more detail, the set of candidate voxels can be restricted to belong to the same slice as the selected voxel. In other words, candidate voxels can be restricted to belong to the intersection of voxels of the layer voxel set and voxel of the current slice. This can ensure traversal proceeds in a slice-by-slice manner.

In particular, if the surface normal of the selected voxel is oriented upwards, the next voxel can be selected from a candidate set as the voxel with a minimal value of the distance-to-empty function or the minimal distance to an exterior voxel. An upward orientation can mean that the surface normal has a positive vertical component. In this case, the outermost voxel of the set of candidate voxels is chosen as the next voxel during traversal.

If the surface normal of the selected voxel is oriented downwards, the next voxel can be selected from a candidate set as the voxel with a maximal value of the distance-to-empty function or the minimal distance to an exterior voxel. A downward orientation can mean that the surface normal has a negative vertical component. In this case, the inner-most voxel of the layer is chosen as the next voxel during traversal.

It is, of course, possible that the interior voxels of the near-surface interior voxel set or the aforementioned at least one interior layer voxel set are traversed correspondingly.

One of the printing materials can be assigned to the current voxel which is selected by the proposed traversal. The current voxel can denote the voxel which is currently selected during the traversal. Untraversed voxels can be voxels to which no printing material has been assigned yet. Moreover, a quantization can be performed for the selected voxel, e.g. according to the previously described embodiment. In particular, untraversed voxels can be non-quantized voxels, wherein traversed voxels can be quantized voxels.

It is also possible to traverse a layer voxel set in multiple runs, in particular if the layer voxel set comprises un-quantized voxels after a run has been terminated.

In addition, the next voxel in the traversal can be determined depending on a comparison of an orientation of a displacement vector between the selected voxel and a candidate voxel to a desired traversal direction orientation, wherein a candidate voxel can be selected as the next voxel if the orientation has a desired traversal direction orientation.

The desired traversal direction orientation can e.g. be a clockwise or counter-clockwise orientation around a central axis of a connected component to which the selected voxel is assigned, wherein the central axis is oriented parallel to the aforementioned vertical axis and points into the same direction. The desired traversal direction orientation can be constant for at least one run. A connected component can denote a set of connected surface and interior object voxels, in particular in a slice containing the selected voxel. In other words, a traversal algorithm with a consistent traversal direction is proposed. In other words, a consistent orientation of the aforementioned error diffusion filter is provided during the proposed traversal which, in turn, ensures or maximizes the probability that color value errors are only distributed among non-quantized voxels.

This means that a wide variety of existing anisotropic two-dimensional error diffusion filters and algorithms can be used by the proposed method. In particular, the previously described fixed or variable-coefficient error diffusion filters can be used.

It is possible that multiple voxels of the layer voxel set are located in a direction with the desired traversal direction orientation. In particular in this case, the next voxel can be determined depending on a distance of the next voxel to an exterior voxel, in particular the nearest exterior voxel. An exterior voxel can denote a voxel outside the printing object. Thus, the distance denotes the minimal distance of the next voxel to a voxel outside the printing object. In particular, the distance can be measured within the slice comprising or containing the selected voxel.

Alternatively, or in addition, the next voxel can be determined depending on an error diffusion measure, wherein the error diffusion measure represents the number of times a color value error has been shifted, e.g. added, to the respective voxel from previously traversed voxels or wherein the error diffusion measure represents the color error value or the amount of color error values which have been distributed to the respective voxel. In particular, the next voxel can be the voxel of the candidate voxels to which the highest error diffusion measure is assigned.

Using the error diffusion count for prioritizing the valid candidate voxels in the slice-dependent traversal can be advantageous in the case where two separate connected components in a previous slice merge into a single connected component in the current slice, allowing the error to be diffused more evenly amongst the surface layer voxels or alternatively amongst the near-surface interior layer voxels.

Further, it is possible to refine the set of candidate voxels depending on the error diffusion measure and then determine the next voxel within the refined set depending on the distance of the next voxel to an exterior voxel or vice versa.

A run can be terminated if the set of candidate voxels is empty. Then, a new run can be started.

It is also possible that the voxels of at least the surface layer voxel set are traversed in at least one run, wherein the next voxel in the traversal is determined such that the color error value of the next voxel is only distributed among untraversed voxels. This means that the next voxel can be determined such that the aforementioned predetermined neighborhood of the next voxel to which the color error value is to be distributed contains at least one untraversed voxel, wherein the color value error is then shifted to this at least one untraversed voxel. Preferably but not mandatory the next voxel can be determined such that all voxels of the aforementioned predetermined neighborhood of the next voxel are untraversed voxel.

The run can be terminated if no untraversed voxel with the aforementioned predetermined neighborhood containing at least one untraversed voxel can be found. It is then possible to assign one of the printing materials to this/these remaining untraversed voxel(s), e.g. to quantize this/these remaining untraversed voxel(s) without an error value distribution, and start a new run.

In particular, the next voxel can be determined from the set of candidate voxels such that the aforementioned predetermined neighborhood of the next voxel to which the color error value is to be distributed contains at least one untraversed voxel, wherein the color value error is then shifted to this at least one untraversed voxel.

The run can be terminated if the predetermined neighborhood of all voxels of the set of candidate voxels does not contain at least one untraversed voxel. It is then possible to assign one of the printing materials to this/these remaining untraversed voxel(s), e.g. to quantize this/these remaining untraversed voxel(s) without an error value distribution, and start a new run.

In total, the proposed traversal tries to traverse upwards through the printing object along the vertical direction. If the printing process is performed slice-by-slice, this advantageously allows printing lower slices of the printing object (as a printing material has already been assigned to voxels of these lower slices) while simultaneously performing an assignment of one of the printing materials to voxels of upper slices of the printing object. This advantageously improves a streaming architecture of the generated printing control data which does not require a full voxel representation for printing.

In a preferred embodiment, a slice-dependent subset of the layer voxel set is determined for each slice. The slice-dependent subset can be determined based on a slice-based representation of the printing object. Such a representation can be determined in a preprocessing step. In particular, the slice-dependent subset can comprise all voxels of the layer voxel set which are intersected by one slice. The thickness of the slice can e.g. correspond dependent on the voxel resolution in the vertical direction. It is, of course, possible that the slice-dependent subset comprises voxels of multiple connected components, wherein separate connected components are not connected with each other.

The voxels of the slice-dependent subset are traversed in at least one run. The aforementioned criteria concerning the determination of the next voxel in the traversal also apply to the traversal of the slice-dependent subset. Also, the next voxel in the traversal can be determined as a voxel, such that the direction from the selected voxel to the next voxel has a desired traversal direction orientation.

Within the slice-dependent traversal, a counter-clockwise traversal direction orientation is given if a cross product between a displacement vector between the selected voxel and a candidate voxel and a gradient vector of the distance-to-empty function at the selected voxel is positive. A clockwise traversal direction is given if a cross product between a displacement vector between the selected voxel and candidate voxel and a gradient vector the distance-to-empty function is negative.

As explained before, the next voxel within the traversal of the slice-dependent subset can also be determined depending on a distance of the next voxel to an exterior voxel, in particular depending on the distance-to-empty function.

It is, of course, possible that a slice-dependent subset is traversed in multiple runs, in particular if no next voxel can be found and the subset still comprises untraversed voxels.

Traversing a slice-dependent subset can be performed for all slices of the printing object.

In another embodiment all voxels of the remaining untraversed voxels are determined at which a surface normal is oriented downwards, wherein a starting voxel for a run is determined as the voxel with a maximal value of the distance-to-empty-function.

Alternatively, all voxels of the remaining untraversed voxels are determined at which a surface normal is oriented upwards, wherein a starting voxel is determined as the voxel with a minimal value of the distance-to-empty-function.

This advantageously allows selecting the innermost or outermost voxel, subject to possible additional criteria, such as the error diffusion count, which in turn ensures that the traversal is performed upwards. Alternatively or in addition, the starting voxel can be selected based on the aforementioned error diffusion measure, e.g. as a voxel with the highest error diffusion measure. It is, for instance, possible to refine a set of candidate starting voxels depending on the error diffusion measure and the determine the starting voxel within the refined set depending on the distance of the next voxel to an exterior voxel or vice versa. If, in particular after refinement, multiple starting voxels exist, the starting voxel can be chosen arbitrarily or by using additional criteria.

In another embodiment a desired traversal direction orientation is reversed in a following run and/or a following slice. This advantageously improves the halftone quality as known to the skilled person (similar to serpentine traversal in 2D error-diffusion).

In another embodiment, the surface layer voxel set and at least one interior layer voxel set, in particular all interior layer voxel sets, are processed in parallel. In particular, voxels of the surface layer voxel set and the at least one interior layer voxel can be traversed and processed, e.g. quantized, simultaneously.

The proposed traversal scheme can be subject of an independent invention and can be performed independent of the feature of determining an arrangement of the printing materials in a surface region and a near-surface interior region of the printing object.

Thus, a method and a device for three-dimensional color printing is described, wherein at least a first printing material with a first printing material color and at least another printing material with another printing material color is used to construct a printing object. Further, at least one object voxel set, in particular a surface layer voxel set, is determined. Further, the voxels of the at least one object voxel set are traversed in at least one run, wherein the next voxel in the traversal is determined depending on the value of a distance-to-empty function of the next voxel. Further, one of the printing materials can be assigned to the current voxel (selected voxel) which is selected by the proposed traversal. Moreover, a quantization, in particular a quantization of the tonal values assigned to the selected voxel, can be performed for this voxel, e.g. according to the previously made description. Further embodiments of the described method can have the traversal-related features or aspects as described previously, in particular the features of the characterizing parts and the features or aspects described in the corresponding part of the description. In particular, a slice-dependent subset of the object voxel set can be determined, wherein the voxels of the slice-dependent subset are traversed in at least one run. Further, all voxels of the remaining untraversed voxels can be determined at which a surface normal is oriented downwards, wherein a starting voxel for a run can be determined as the voxel with a maximal distance to the closest exterior voxel or all voxels of the remaining untraversed voxels are determined at which a surface normal is oriented upwards, wherein a starting voxel for a run is determined as the voxel with a minimal distance to the closest exterior voxel. Further, a desired traversal direction can be reversed in a following run and/or a following slice. Further, at least two object voxels sets can be processed in parallel.

In another embodiment, at least one support material with a support material color is used as an additional printing material. In addition to the use as a printing material, the support material can be used to support the construction of the printing object. In other words, the at least one support material is (additionally) used to construct the printing object.

Thus, support material can be used for either supporting the construction of the printing object or for constructing the printing object. In the following, the support material can refer to the support material used for constructing the printing object.

That the at least one support material is (additionally) used to construct the printing object means that at least one object voxel is filled by the support material or that at least one object voxel is provided by a support material. In other words, a printing object is constructed by using at least one printing material and at least one support material. Thus, support material is not only used to support the printing process and to be removed afterwards but to provide at least a portion of the printing object. The characteristics of the support material, in particular the mechanical characteristics, e.g. a breaking resistance, can be different from the corresponding characteristics of the printing materials.

Further, the at least one support material color is selected such that a color gamut defined by the at least one printing material color, preferably defined by all colors of the used printing materials, is extended. The color gamut can e.g. be specified in the so-called CIELAB color space.

As the support material is used as an additional printing material, the support material can be arranged in a surface region and in a near-surface interior region of the printing object based on a desired color reproduction of the printing object. In particular, the support material can be assigned to a volume fraction of the printing object, in particular to a voxel, based on a desired color reproduction of the printing object.

It is, for instance, possible to use a first printing material with a white printing material color, a second printing material with a magenta printing material color and a third printing material with a cyan printing material color. In this case, the support material color can e.g. have a yellow support material color.

The invention, however, is not restricted to this choice of printing and support material colors. The skilled-person is aware of any printing and support material color selection by which the color gamut defined by the printing material color(s) is extended, in particular in a desired way.

In other words, the usage of at least one support material with a support material color in a method for three-dimensional printing is described, wherein the support material is (additionally) used to construct the printing object, wherein the at least one support material color is selected such that the color gamut defined by the printing material color(s) is extended.

In another embodiment, support material is only used to construct or provide an interior voxel. An interior voxel has been defined previously. In this case, all surface voxels can be constructed or provided by a printing material (and not by support material). An interior voxel can also be a support material voxel of a set of connected support material voxels, wherein the set of connected support material voxels is fully enclosed by printing material voxels. Moreover, all surface voxels can be printing material voxels. In other words, support material is not used to construct or provide the surface layer of the printing object. The number of support material voxels within a set of connected support material voxels can be smaller than a predetermined threshold number.

A print material voxel denotes a voxel of or provided by printing material. Correspondingly, a support material voxel denotes a voxel of or provided by support material.

As the used support material voxels are shielded by printing material voxels, the risk of an unwanted removal of the support material which is used as an additional printing material in the removal step is reduced. This advantageously improves a mechanical stability of the printing object.

In an alternative embodiment, an arrangement of printing material and support material, in particular of printing material voxels and support material voxels, is provided such that a number of voxels of a set of connected support material voxels is smaller than a predetermined support material voxel number if at least one of the support material voxels is a surface layer voxel. In particular, the arrangement of printing material and support material can be provided such that the number of surface layer voxels of the set of connected support material voxels is smaller than another predetermined surface layer voxel number. The predetermined maximal number of connected support material voxels can e.g. be 10. The predetermined maximal number of connected support material voxels where at least one of the support material voxels is a surface layer voxel can e.g. be in the range of 1 to 5. It is, however, possible that all support material voxels of the set of connected support material voxels are surface voxels.

Limitation of the surface layer voxels provided by support material advantageously ensures that the risk of an unwanted removal of the support material voxels which provide object voxels in the removal step is reduced or limited to the set of voxels with the limited support material voxel number. If, for instance, the printing object with support material portions is put into chemical bath, only a limited number of support material voxels which simultaneously are object voxels are exposed to the risk of removal. This advantageously ensures stability, in particular a mechanical stability of the printing object after the removal step.

In another embodiment, an arrangement of print material and support material, in particular of print material voxels and support material voxels, is provided such that the spatial frequency spectrum of support material voxels has spectral components for non-zero frequencies whose absolute values are larger than zero. This holds for regions of the printing object in which support material is used or present. The spatial frequencies can be provided by a number of voxel pairs along paths with a predetermined length, wherein one path can extend in or along any spatial direction, in particular along the aforementioned X-direction, Y-direction and/or Z-direction. A voxel pair is provided by two adjacent voxels (filled with support material or printing material) along said path.

That the spatial frequency spectrum of support material voxels has spectral components for non-zero frequencies whose absolute values are larger than zero can be the case if the spatial frequency spectrum of support material voxels has the spectral characteristics of blue noise. Corresponding spectral characteristics are e.g. defined in the document "Lau, Daniel L., and Gonzalo R. Arce. Modern digital halftoning. CRC Press, 2001". In particular, blue noise has little or no low-frequency spectral components and/or a flat, high-frequency (blue-noise) spectral region and/or a spectral peak at the principle frequency (which depends on the percentage of support material voxels within all path voxels).

The more similar the spatial frequency spectrum of the support material voxels is to the ideal blue noise spectrum, the smaller the risk of an unwanted removal of an undesired amount of support material voxels as the size of two- or a three-dimensional connected support material voxel components is limited. Similarity can e.g. be measured using the root mean square difference between the spatial frequency spectra. Thus, if a removal process is applied to a certain part of the printing object, the number of removed support material voxels can be reduced. This advantageously increases the stability of the printing object.

In another embodiment, an arrangement of printing material and support material, in particular of printing material voxels and support material voxels, is provided such that a translucence of the object voxels along an optical path between a support material voxel and an object environment is higher than a desired threshold value. This can mean that an attenuation of light, in particular of visible light, along said optical path can be smaller than a predetermined threshold value, e.g. smaller than 0.5, 0.25 or 0.05. In this context, the term translucence can also denote a transparency of the object voxels along the optical path.

The optical path can be any optical path or the shortest optical path between the selected support material voxel and the environment of the printing object. However, the arrangement of printing material and support material can also be provided such that the desired translucence is provided along all possible optical paths between the support material voxel and the environment. This is in particular preferable if support material is only used to construct or to provide an interior object voxel. This embodiment advantageously allows providing a high stability of the printing object while the color gamut of reproducible colors is enlarged.

Further described is an embodiment, wherein an arrangement of printing material and support material, in particular printing material and support material voxels, is provided such that no visual artifacts are produced. Visual artifacts can denote artifacts recognizable by a human observer, in particular from a predetermined distance, e.g. a distance larger than 0.1 m, 0.2 m or 0.3 m. For instance, the arrangement can be provided such that no visual or detectable boundaries between support material regions and printing material regions can be observed.

In another embodiment, a percentage of support material used to construct the printing object and/or a predetermined volume fraction of the printing object is smaller than a predetermined threshold value. The percentage denotes a support material portion of the totality of support and printing material used to construct the printing object or the volume fraction. The predetermined threshold value can e.g. be chosen from the range of 0 (exclusive) to 0.5 (inclusive), in particular can be chosen as 0.1, 0.2, 0.3, 0.4 or 0.5.

It has been discovered in simulations and experiments that the higher the percentage of support material used to construct the printing object, the lower the mechanical stability of the printing object, in particular the breaking resistance.

Different support materials, however, in particular in combination with different printing materials, can provide a different stability performance. Thus, the predetermined threshold value can be chosen application-dependent, in particular depending on material characteristics of the used printing and support materials such that a desired mechanical stability, e.g. breaking resistance, is provided. This advantageously reduces a risk of an instable printing object.

In another embodiment, the printing process, e.g. the process of arranging printing material voxels and support material voxels, is at least partially controlled by a printing material color vector. The printing material color vector has been introduced previously. In particular, the printing material color vector denotes an un-quantized color vector which comprises at least one color-related entry per printing material. As the support material is used as an additional printing material, the printing material color vector can also comprise one color-related entry for the support material. Also, the support material color can provide the aforementioned reference color. The maximum admissible printing material color value of the support material color-related entry is smaller than the maximum admissible printing material color value of the printing material color-related entries.

It is, for instance, possible that the printing material color values can take values between 0 (inclusive) to 255 (inclusive). In this case, the maximum admissible color value of the support material color-related entry can be smaller than 255, e.g. equal to a percentage of the maximum admissible printing material color value, wherein the percentage equals to the aforementioned predetermined threshold value of the percentage of support material used to construct the printing object and/or a volume fraction thereof.

If e.g. the maximum admissible percentage of support material used to construct the printing object and/or a predetermined volume fraction thereof is smaller than or equal to 50%, the maximum admissible color value of the support material color-related entry can be smaller than or equal to 255/2.

It is, for instance, possible that a desired printing material color vector is provided, e.g. based on the aforementioned modelling step, wherein the support material color-related entry of said printing material color vector is limited, e.g. reduced or clipped, to the maximum admissible value of the support material color-related entry if the desired value is higher than said maximum admissible value.

Using the proposed limitation advantageously ensures that the amount of support material which is used to provide a desired color reproduction, is effectively limited as the maximum intensity of the support material color is limited.

Further described is an embodiment, wherein the value of the support material color-related entry is provided by scaling a desired support material color value to the range of 0 (inclusive) to the maximum admissible color value of the support material color-related entry. For instance, the color value can be provided by a linear scaling. In this case, a desired support material color value which corresponds to a maximum color value, e.g. to 255, can be scaled to the maximum admissible color value of the support material color-related entry, e.g. to 30 or 255/2. Desired support material color values smaller than the maximum color value can be scaled correspondingly to color values smaller than 30 or 255/2.

This advantageously improves the computational processing of control data for the printing process.

Further described is an embodiment, wherein an arrangement of printing material and support material, in particular printing material and support material voxels, is determined by a half-toning algorithm. In particular, an assignment of one of the printing materials including the support material providing an additional printing material can be determined by the half-toning algorithm. An adequate half-toning algorithm can be chosen by the skilled person. In particular, the half-toning algorithm can be chosen as the previously described nibbling half-toning algorithm or layered half-toning algorithm. In particular, a blue noise error diffusion algorithm or a so-called frequency-modulated half-tone algorithm can be chosen.

In particular, the half-toning algorithm can be chosen such that one or all of the aforementioned arrangement-related criteria concerning the arrangement of support material and printing material are fulfilled. In particular, the half-toning algorithm can be chosen such that support material is only used to construct or provide interior voxels or such that a number of voxels of a set of connected support material voxels is smaller than a predetermined support material voxel number if at least one of the support material voxels is a surface layer voxel. Further, the half-toning algorithm can be applied such that the spatial frequency spectrum of support material voxels has spectral components for non-zero frequencies whose absolute values are larger than zero and/or a translucence of object voxels along the aforementioned optical path is higher than a desired threshold value and/or such that no visual artifacts are produced and/or such that a percentage of support material used to construct the printing object and/or a predetermined volume fraction thereof is smaller than a predetermined threshold value.

This advantageously allows constructing a stable printing object with an improved coloration. The proposed usage of the support material as an additional printing material constitutes an independent invention and can be performed independent of the feature of determining an arrangement of the printing materials in a surface region and a near-surface interior region of the printing object.

Thus, a method and a device for three-dimensional color printing is described, wherein at least a first printing material with a first printing material color is used to construct a printing object. Further, at least one support material is used as an additional printing material, i.e. additionally used to construct the printing object, wherein the at least one support material color is selected such that the color gamut defined by the printing material color(s) is extended. In addition to the use as a printing material, the at least one support material with a support material color can be used to support the construction of the printing object. Further embodiments of the described method can have one or multiple features related to the use of the support material as an additional printing material as described previously, in particular the features of the characterizing parts and the features or aspects described in the corresponding part of the description. As the support material is additionally used as a printing material, the support material can be arranged in a surface region and/or in a near-surface interior region of the printing object based on a desired color reproduction of the printing object. In particular, the support material can be assigned to a volume fraction of the printing object, in particular to a voxel, based on a desired color reproduction of the printing object.

Further proposed is a three-dimensional color printing device (3D printer), wherein the printing device comprises a means for printing a first printing material with a first printing material color, e.g. a first print head. Further, the printing device comprises a means for printing at least another printing material with another printing material color and at least one control unit. The means for printing a first printing material is controlled such that the first printing material is used to construct a printing object, wherein the means for printing the at least one other printing material is controlled such that the at least one other printing material is used to construct the printing object. The means for a printing can e.g. be controlled by the control unit.

According to the invention, the means for printing the first printing material and the at least one other printing material are controlled such that an arrangement of the printing materials in a surface region and a near surface interior region of the printing object is provided such that a desired color reproduction of the printing object is provided.

The proposed printing device advantageously allows performing a method according to one of the previously described embodiments.

In particular, the printing device can comprise more than one, e.g. two or three, means for printing printing materials with different colors and one means for printing the support material.

Further described is a three-dimensional color printing device, wherein the printing device comprises a means for printing a first printing material with a first printing material color, e.g. a first print head. Further, the printing device comprises a means for printing at least another printing material with another printing material color and at least one control unit. The means for printing a first printing material is controlled such that the first printing material is used to construct a printing object, wherein the means for printing the at least one other printing material is controlled such that the at least one other printing material is used to construct the printing object. The means for a printing can e.g. be controlled by the control unit. Further, at least one object voxel set, in particular a surface layer voxel set, is determinable, e.g. by the control unit. Further, the voxels of the at least one object voxel set are traversable in at least one run, wherein the next voxel in the traversal is determinable depending on the value of a distance-to-empty function of the next voxel. Further, one of the printing materials can be assignable to the current voxel (selected voxel) which is selected by the proposed traversal. Moreover, a quantization, e.g. of a tonal value, can be performable for the selected voxel. The described printing device allows performing the proposed traversal scheme which, as described previously, can be subject of an independent invention.

Further described is a three-dimensional color printing device (3D printer), wherein the printing device comprises a means for printing a first printing material with a first printing material color, e.g. a first print head. Further, the printing device comprises a means for printing at least one support material with a support material color and at least one control unit. The means for printing a first printing material is controlled such that the first printing material is used to construct a printing object, wherein the means for printing the support material is controlled such that the at least one support material is used to construct the printing object, wherein the support material color is selected such that the color gamut defined by the printing material color(s) is extended. In addition, the means for printing the support material can be controlled such that the at least one support material is used to support the construction of the printing object. The described printing device allows performing the method of using the support material as an additional printing material which, as described previously, can constitute an independent invention.

BRIEF DESCRIPTION OF THE DRAWING FIGURES

The invention will be described with reference to the attached Figures. The Figures show:

FIG. 1: A schematic block diagram of a 3D color printer,

FIG. 2: A schematic representation of printing object voxels,

FIG. 3: A schematic flow diagram of a method for 3D color printing,

FIG. 4a: A schematic representation of a color gamut defined by printing material colors, FIG. 4b: A schematic representation of a color gamut defined by printing material and support material colors, FIG. 5a: A schematic representation of a color gamut of printing material colors, FIG. 5b: A schematic representation of a color gamut defined by printing material and support material colors, FIG. 6: A schematic representation of a printing object surface layer.

DETAILED DESCRIPTION OF THE PREFERRED EMBODIMENTS

In the following, corresponding reference numerals denote elements with the same or similar technical features.

FIG. 1 shows a schematic representation of a 3-dimensional color printing device 1. The printing device 1 comprises a first print head 2 for printing a first printing material with a first printing material color, e.g. a white color. The printing device further comprises a second print head 3 for printing a second printing material with a second printing material color, e.g. a magenta color. Further, the printing device comprises a third print head 4 for printing a third printing material with a third printing material color, e.g. a cyan color. Further, the printing device 1 comprises a fourth print head 5 for printing a fourth printing material with a fourth printing material color, e.g. a yellow color.

The fourth printing material can be an additional printing material which can be provided by a support material 6. In this case, the fourth printing material color can be equal to a support material color. Support material-related aspects of the following description can, however, also apply to the usage of a fourth printing material (which is not provided by a support material). It is thus possible to use a printing material which is not a support material instead of the described support material 6.

The printing material colors are different from one another. Further shown is a printing object 7 which is T-shaped.

Indicated is a reference coordinate system with a longitudinal axis which is also referred to as X-axis. An arrowhead indicates an X-direction. Further indicated is a vertical axis which is also referred to as Z-axis, wherein an arrowhead indicates a vertical direction. The vertical axis is pointing upwards. FIG. 6 shows a lateral axis which is also referred to as Y-axis, wherein an arrowhead indicates a Y-direction.

The printing object 7 comprises two over-hanging portions, wherein support material 6 is arranged under these over-hanging portions in order to physically support the construction of the printing object 7. These support material portions can also be referred to as external support material portions 6a. After printing has been finished, these external support material portions can be removed in a removal step, e.g. mechanically or chemically.

Further shown are portions 6b of support material which have been used to construct the printing object 7, in particular interior portions. These portions 6b of support material 6 are arranged in order to provide a desired color reproduction of the printing object 7 or a volume fraction thereof. As these support material portions 6b are interior object portions, they cannot be removed after printing has been finish.

Further shown is that the printing device 1 comprises a control unit 8 for controlling a movement and/or an operation of the print heads 2, 3, 4, 5.

In particular, the print heads 2, 3, 4, 5 which provide means for printing the printing materials can be controlled such that the printing materials are arranged within a surface region and a near surface interior region of the printing object 7 such that a desired color reproduction of the printing object 7 is provided. In other words, the arrangement of printing materials is provided such that a desired coloration of the printing object 7 is provided while a mechanical stability of the printing object 7 is ensured.

FIG. 2 shows a region of the printing object 7. Shown are voxels of the printing object 7, wherein these voxels can be provided by printing material or support material, i.e. additional printing material.

With reference to the vertical direction, the voxels of the first row (highest row or top row) of voxels are surface voxels of a surface layer voxel set of the printing object 7. The remaining voxels, in particular the voxels within the remaining lower rows, are interior voxels of a near surface interior voxel set of the printing object 7. In particular, the voxels of the second row can be voxels of a first interior layer voxel set, wherein the distances of all voxels of the first interior layer voxel set to the respective closest surface voxel are within a predetermined distance interval, in particular a distance interval ranging from a value corresponding to size of one voxel in the vertical direction to a maximal value corresponding to twice the height of one voxel in the vertical direction. Correspondingly, the voxels of the remaining rows can be voxels of other interior layer voxel sets.

Support material voxels V6, e.g. voxels provided by support material, in particular a predetermined amount of support material, are indicated by shaded voxels. The remaining unshaded voxels indicate printing material voxels which are either provided by the first, the second or the third printing material. A first support material voxel V9 is an interior voxel. In particular, the interior object voxel V9 is fully enclosed by printing material voxels and does not belong to a set of connected support material voxels V6 with at least one surface voxel V10. Such an interior voxel 9 is protected by printing material voxels and thus cannot be removed by the afore-mentioned mechanical or chemical means.

Further indicated are surface voxels V10 which are also provided by support material 6. One of the surface voxel V10 belongs to a set of connected support material voxels V6, wherein the set comprises five support material voxels V6.

In summary, the arrangement of printing material and support material is provided such that a number of voxels of a set of connected support material voxels V6 is smaller than a predetermined number, e.g. 10, if at least one or all of the support material voxels V6 is/are (a) surface voxel(s).

Further, the arrangement of printing material and support material is provided such that the spatial frequency spectrum of support material voxels V6 has spectral components for non-zero-frequencies whose absolute values are larger than zero, in particular in the top row along the longitudinal direction x.

Further indicated is an exemplary optical path 11 to the interior voxel V9, wherein three object voxels, e.g. printing material voxels, are arranged between the (external) environment of the printing object 7 and the interior voxel V9. The printing material voxels along said optical path 11 can be provided such that desired transparency or translucence is provided, in particular for visible light. For instance, the transparency can be provided such that an attenuation of visible light along said optical path is smaller than 0.1.

Further shown is that the number of support material voxels V6 is equal to 8, wherein the total number of voxels of the shown region or volume fraction of the printing object 7 equals to 85. Hence, the fraction of support material 6 used to construct the shown volume fraction of the printing object 7 is smaller than a threshold value of 0.3.

FIG. 3 shows a schematic flow diagram of the proposed method. In a first step which is not necessarily part of the claimed method, a CAD-based modelling of the printing object 7 (see e.g. FIG. 1) is performed. Within this modeling step S1, a geometric shape and a coloration of the printing object 7 is defined. In a compilation step S2, the data encoding the printing object 7 model is compiled in order to generate control data for the control unit 8 (see FIG. 1) or the print heads 2, 3, 4, 5, in particular for an operation and/or movement of the print heads 2, 3, 4, 5.

The modelling data can comprise a printing color vector which comprises at least one color-related entry per used printing material. In this case, the color value of the support material color related-entry can be scaled. In particular, the maximum admissible color value of the support material color-related entry can be limited to a value smaller than the maximum admissible color value of the remaining printing material color-related entries.

It is also possible that a voxelization is performed in the second step. Further, one of the printing materials can be assigned to each voxel of a surface layer voxel set and a near-surface interior voxel set. The assignment can e.g. be provided by using a half-toning algorithm, in particular a half-toning algorithm comprising an error distribution.

In particular, a quantization of tonal values or entries of a printing material color vector can be performed for each voxel of at least the surface layer voxel set, wherein the assignment of a printing material to the respective voxel is then based on a set of quantized printing material colors and/or wherein a color error value is distributed among voxels within a predetermined neighborhood of the respective layer voxel.

Within the second step, one or multiple interior layer voxel sets of the printing object 7 can be determined in addition to the surface layer voxel set, wherein to each voxel of the interior layer voxel set a printing material color vector of the closest surface voxel is assigned.

It is, for instance possible, to traverse the voxels within each layer voxel set in at least one run, respectively. The next voxel in the traversal can be determined such that the color error value of the next voxel is only distributed only among untraversed voxels. One of the printing materials can be assigned to the voxel which is currently selected during traversal. Within the second step, it is also possible to determine a slice-dependent subset of the surface layer voxel set, wherein the voxels of the slice-dependent subset are traversed in at least one run. Different layers can be processed in parallel.

Alternatively, only the surface voxels can be quantized, e.g. by traversing the surface voxels of the surface layer voxel set in at least one run. Then, for each surface voxel of the surface layer voxel set, a set of non-quantized neighboring interior voxels can be determined, wherein a limited number of closest non-quantized neighboring interior voxels are determined, wherein a single maximal color value of the quantized set of printing material colors, i.e. of the quantized printing material color vector, of the surface voxel is assigned to each of these non-quantized neighboring interior voxels of the predetermined number in an alternating way. If all entries of the quantized printing material color vector are minimal color values, a reference color, e.g. white, can be assigned to each of these non-quantized neighboring interior voxels.

A traversal direction orientation during different runs or between different slice-traversals can be changed.

In summary, an assignment of a printing material to the surface voxels and near surface interior voxels is performed in the second step. The assignment is performed such that a desired arrangement of printing materials and support material within the printing object 7 is achieved, in particular such that the arrangement provides a desired coloration and a desired stability of the printing object 7.

In a printing step S3, the printing object 7 is printed by controlling a printing operation, e.g. in form of a disposal of printing material, and movement of the print heads 2, 3, 4, 5 depending on the assignment determined in the second step S2.

It is possible that a layer of the printing object 7 is printed while voxels belonging to a higher layer of the printing object 7 are still processed in the second step S2.

FIG. 4a shows a schematic representation of a color gamut CS (within a color space, e.g. CIELAB) of printing material colors namely cyan color C, magenta color M and a yellow color Y. A mixed color CMY indicates that a mixture of said printing material colors C, M, Y results in a color which is darker than the respective printing material colors C, M, Y because the mixture of these printing material colors is a subtractive mixture. In particular the color gamut CS defined by the printing material colors C, M, Y does not comprise a white color. FIG. 4b indicates a color gamut defined by the printing material colors C, M, W and a support material color, namely a yellow color Y. In this case, the support material provides the yellow color Y and a printing material provides the white color W. By replacing the yellow printing material with a white printing material and adding the support material 6 with the yellow support material color it is theoretically possible to print lighter colors than producible only with printing material colors C, M and Y. In particular white regions or volume fractions of the printing object 7 can be printed. Thus, the color gamut CS has been enlarged.

Figure 1:
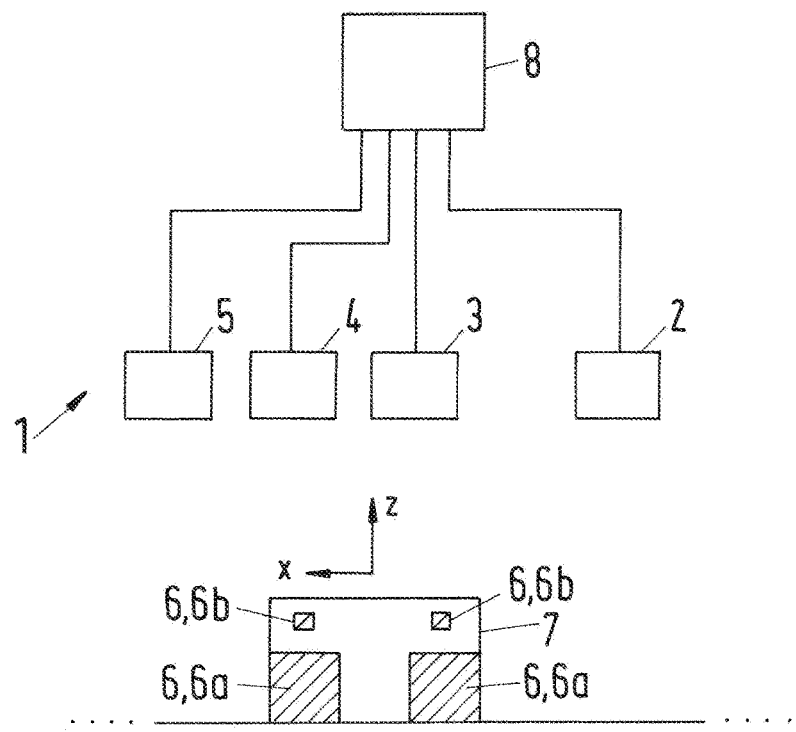
Figure 2:
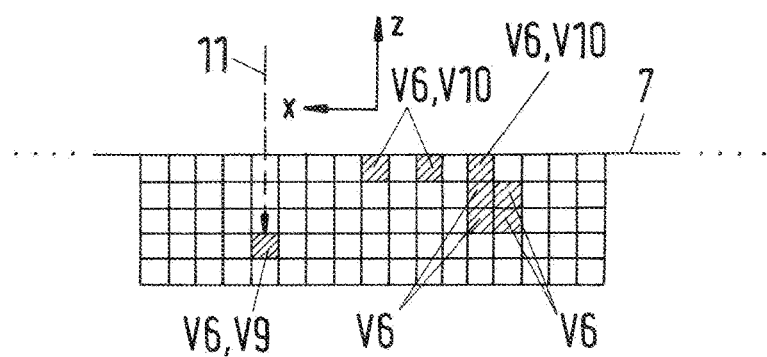
Figure 3:
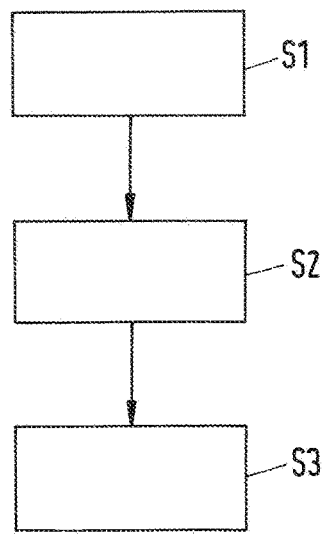
Figure 4A:
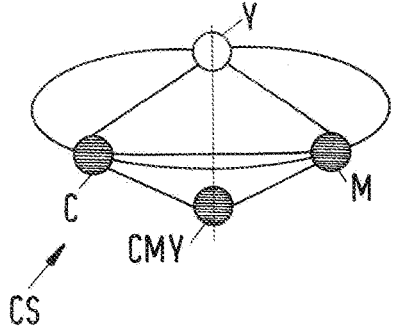
Figure 4B:
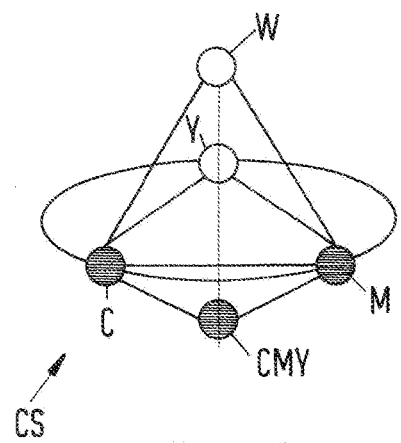
Figure 5A:
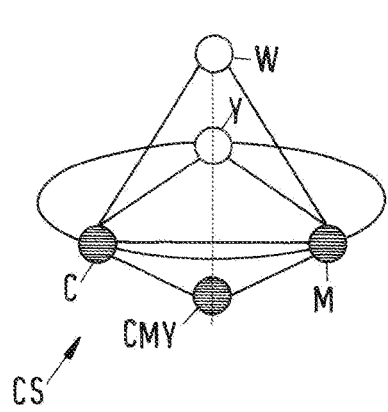
FIG. 5a shows schematic representation of a color gamut CS of a 3D printer with four printing material colors, namely a cyan color C, a magenta color M, a yellow color Y and a white color W. Further shown is the darkest color which reproducible by a mixture of the printing materials colors CMYW.
Figure 5B:
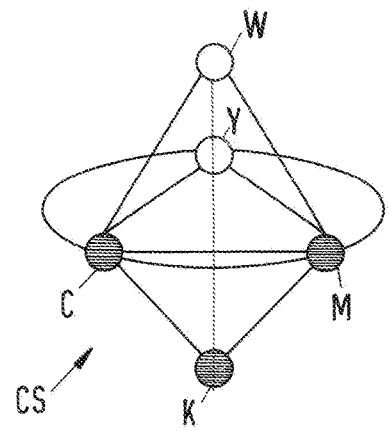
FIG. 5b shows a color gamut CS of a 3D printer which uses a support material 6 with a black color K as an additional printing material. By adding the support material 6 with the black color K, colors darker than the darkest color obtainable by a mixture CMYW can be produced.
Figure 6:
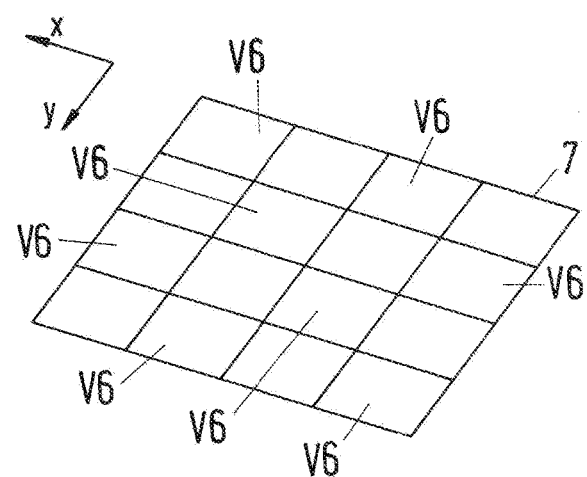

FIG. 6 shows a schematic representation of a surface layer of a printing object 7. Indicated are support material voxels V6, wherein support material voxels V6 have a yellow color Y. Colors of remaining printing material voxels can be either a cyan color C, a magenta color M or a white W. Further indicated are a longitudinal axis x and a lateral axis y. Within the section of the surface layer which is shown in FIG. 6, printing material voxels and support material voxels V6 are arranged such that a spatial frequency of support material voxels V6 is maximum. In this case, the frequency along the longitudinal axis x is defined as the number of voxel pairs along a path comprising four voxels. A voxel pair consists of a support material voxel V6 and an adjacent printing material voxel. Thus, the maximum number of voxel pairs is two. Further, the spatial frequency of support material voxels V6 along the lateral axis y and along the path comprising four voxels is also maximal. Further, the spatial frequency spectrum of the support material voxels V6 has blue noise characteristics along the lateral axis y.

The invention claimed is:

1. A method for three-dimensional color printing, wherein at least a first printing material with a first printing material color and at least another printing material with another printing material color is used to construct a printing object (7), wherein an arrangement of the printing materials in a surface region and a near surface interior region of the printing object (7) is determined based on a desired color reproduction of the printing object (7); wherein at least one interior layer voxel set of the printing object is determined, wherein the distances of all voxels of the interior layer voxel set to a respective closest surface voxel are within a predetermined distance interval, and wherein to each voxel of the interior layer voxel set a printing material color vector of the closest surface voxel is assigned.

2. The method according to claim 1, characterized in that a surface layer voxel set and a near-surface interior voxel set are determined, wherein the surface layer voxel set comprises all surface voxels, wherein one of the printing materials is assigned to each surface voxel, wherein one of the printing materials is assigned to each near-surface interior voxel, wherein the assignment of a printing material to a voxel is based on a desired color reproduction of the printing object.

3. The method according to claim 2, characterized in that for each voxel of at least the surface layer voxel set, a printing material color quantization is performed, wherein for each printing material color, a minimal or maximal color value is assigned to the respective voxel, wherein a color error value is distributed among voxels within a predetermined neighborhood of the respective voxel, wherein the assignment of a printing material to the respective voxel is based on a set of quantized printing material colors.

4. The method according to claim 3, characterized in that for each surface voxel of the surface layer voxel set, a set of non-quantized neighboring interior voxels is determined, wherein a subset with a limited number of closest non-quantized neighboring interior voxels is selected, wherein a single maximal color value of the set of quantized printing material colors of the surface voxel is assigned to each non-quantized neighboring interior voxel of the subset in an alternating way.

5. The method according to claim 2, characterized in that the voxels of at least the surface layer voxel set are traversed in at least one run, wherein the next voxel in the traversal is determined depending on the value of a distance-to-empty function of the next voxel.

6. The method according to claim 5, characterized in that a slice-dependent subset of a layer voxel set is determined, wherein the voxels of the slice-dependent subset are traversed in at least one run.

7. The method according to claim 5, characterized in that all voxels of the remaining untraversed voxels are determined at which a surface normal is oriented downwards, wherein a starting voxel for a run is determined as the voxel with a maximal distance to the closest exterior voxel or all voxels of the remaining untraversed voxels are determined at which a surface normal is oriented upwards, wherein a starting voxel for a run is determined as the voxel with a minimal distance to the closest exterior voxel.

8. The method according to claim 5, characterized in that a desired traversal direction orientation is reversed in a following run and/or a following slice.

9. The method according to claim 3, characterized in that the surface layer voxel set and at least one interior layer voxel set are processed in parallel.

10. The method according to claim 1, characterized in that at least one support material (6) with a support material color is used as an additional printing material, wherein the at least one support material color is selected such that a color gamut (CS) defined by the printing material color(s) is extended.

11. The method according to claim 10, characterized in that support material (6) is only used to construct or provide an interior voxel (8).

12. The method according to claim 10, characterized in that an arrangement of printing material and support material is provided such that a number of voxels of a set of connected support material voxels (V6) is smaller than a predetermined support material voxel number if at least one of the support material voxels (V6) is a surface layer voxel (10).

13. The method according to claim 10, characterized in that an arrangement of print material and support material is provided such that the spatial frequency spectrum of support material voxels (V6) has spectral components for non-zero frequencies whose absolute values are larger than zero.

14. The method according to claim 10, characterized in that an arrangement of printing material and support material (6) is provided such that a translucence of the object voxels along an optical path (11) between a support material voxel (V6) and a printing object environment is higher than a desired threshold value.

15. The method according to claim 10, characterized in that a percentage of support material (6) used to construct the printing object (7) and/or a predetermined volume fraction of the printing object (7) is smaller than a predetermined threshold value.

16. The method according to claim 10, characterized in that the printing process is at least partially controlled by a printing material color vector, wherein the maximum admissible support material color value of the support material color-related entry is smaller than the maximum admissible printing material color value of the printing material color-related entries.

17. The method according to claim 3, characterized in that at least one interior layer voxel set of the printing object is determined, wherein the distances of all voxels of the interior layer voxel set to a respective closest surface voxel are within a predetermined distance interval, wherein to each voxel of the interior layer voxel set a printing material color vector of the closest surface voxel is assigned.

18. A method for three-dimensional color printing, wherein at least a first printing material with a first printing material color and at least another printing material with another printing material color is used to construct a printing object (7), wherein an arrangement of the printing materials in a surface region and a near surface interior region of the printing object (7) is determined based on a desired color reproduction of the printing object (7);

wherein a surface layer voxel set and a near-surface interior voxel set are determined, wherein the surface layer voxel set comprises all surface voxels, wherein one of the printing materials is assigned to each surface voxel, wherein one of the printing materials is assigned to each near-surface interior voxel, wherein the assignment of a printing material to a voxel is based on a desired color reproduction of the printing object;

wherein for each voxel of at least the surface layer voxel set, a printing material color quantization is performed, wherein for each printing material color, a minimal or maximal color value is assigned to the respective voxel, wherein a color error value is distributed among voxels within a predetermined neighborhood of the respective voxel, wherein the assignment of a printing material to the respective voxel is based on a set of quantized printing material colors;

wherein at least one interior layer voxel set of the printing object is determined, wherein the distances of all voxels of the interior layer voxel set to a respective closest surface voxel are within a predetermined distance interval, wherein to each voxel of the interior layer voxel set a printing material color vector of the closest surface voxel is assigned;

wherein for each surface voxel of the surface layer voxel set, a set of non-quantized neighboring interior voxels is determined, wherein a subset with a limited number of closest non-quantized neighboring interior voxels is selected, wherein a single maximal color value of the set of quantized printing material colors of the surface voxel is assigned to each non-quantized neighboring interior voxel of the subset in an alternating way; and wherein the voxels of at least the surface layer voxel set are traversed in at least one run, wherein the next voxel in the traversal is determined depending on the value of a distance-to-empty function of the next voxel.

* * * * *